Dec. 18, 1951     P. E. PEARSON ET AL     2,578,832
CAN BODY WELDING MACHINE INCLUDING, MOVABLE
AND ROTATABLE ELECTRODE
Filed Nov. 5, 1945     11 Sheets-Sheet 1
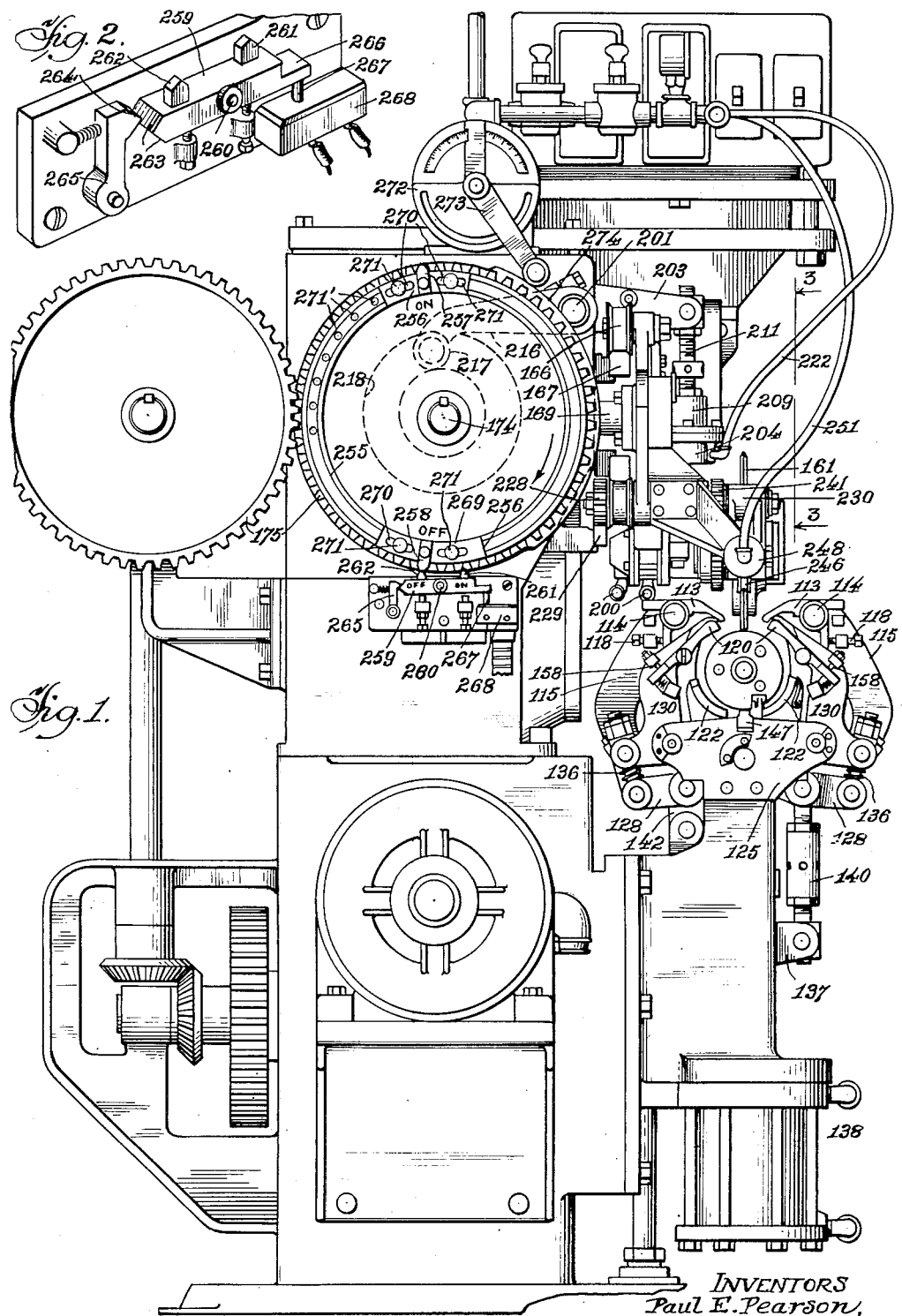
INVENTORS
Paul E. Pearson,
Alfred Treff Dec. 18, 1951 P. E. PEARSON ET AL 2,578,832
CAN BODY WELDING MACHINE INCLUDING, MOVABLE
AND ROTATABLE ELECTRODE
Filed Nov. 5, 1945 11 Sheets-Sheet 2

INVENTORS
Paul E. Pearson,
BY Alfred Treff.
Munn, Porter & Dilean
ATTORNEYS

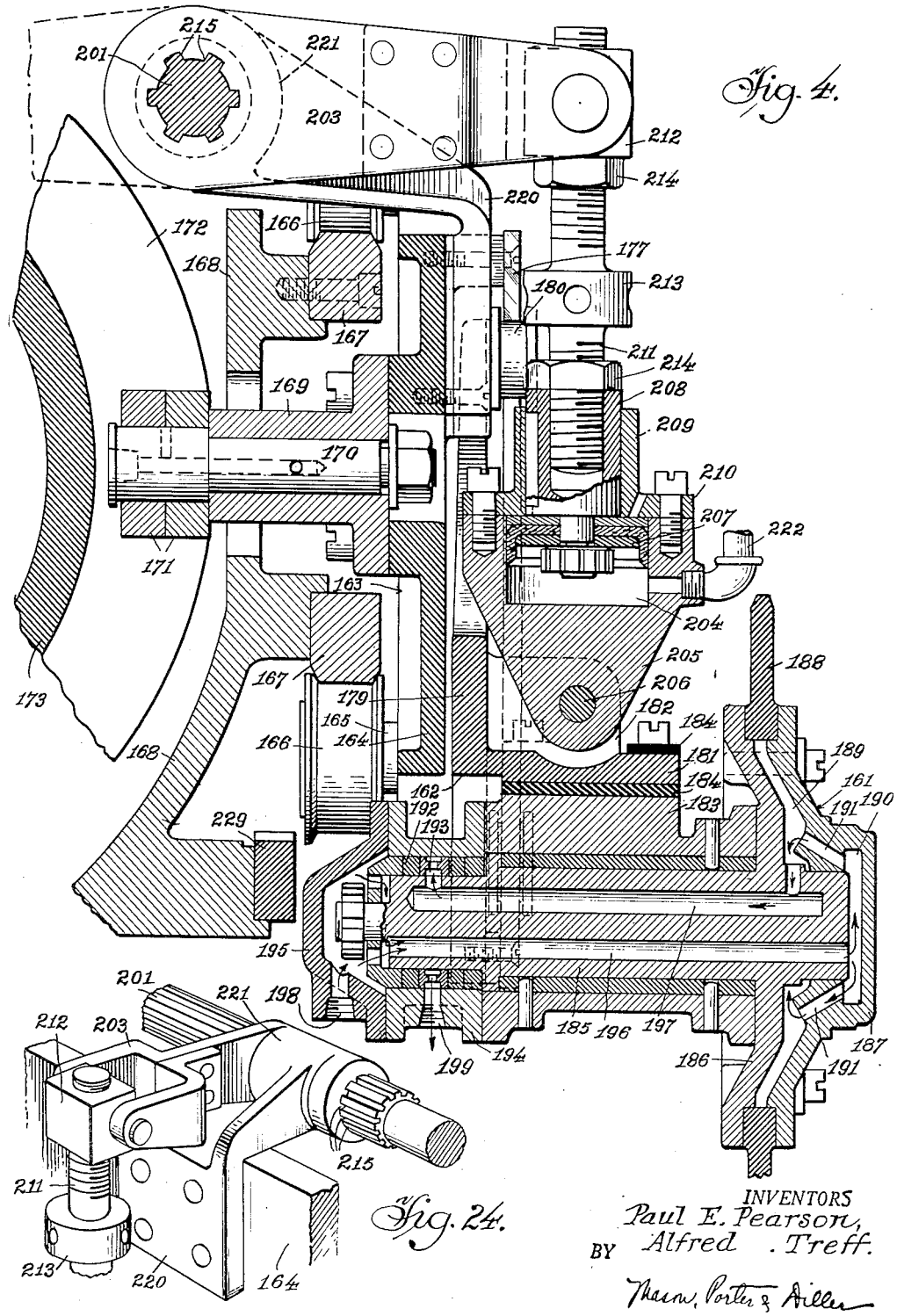

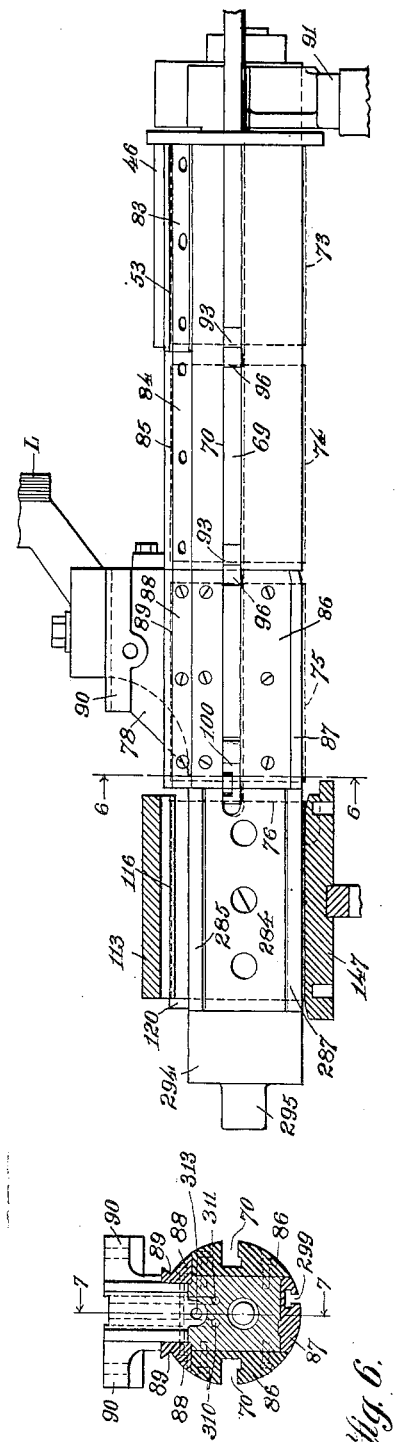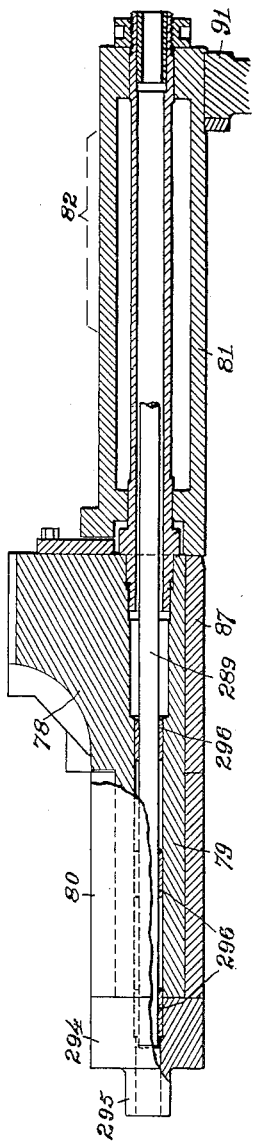

INVENTORS
Paul E. Pearson,
Alfred Treff.

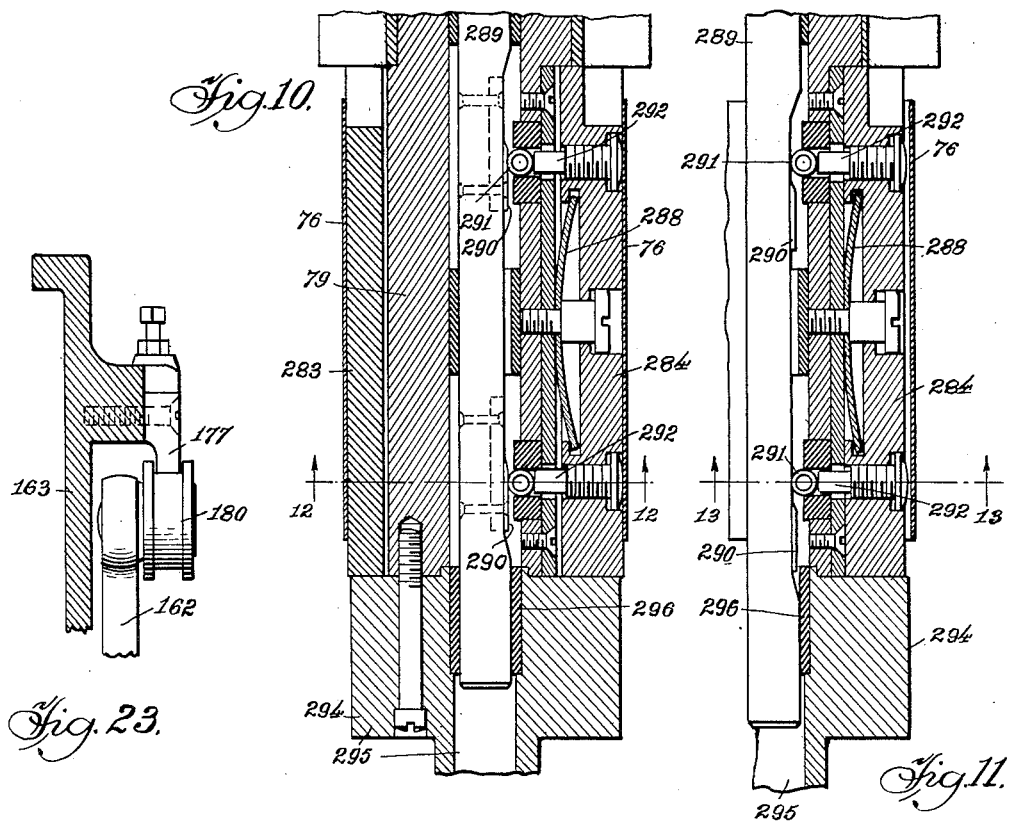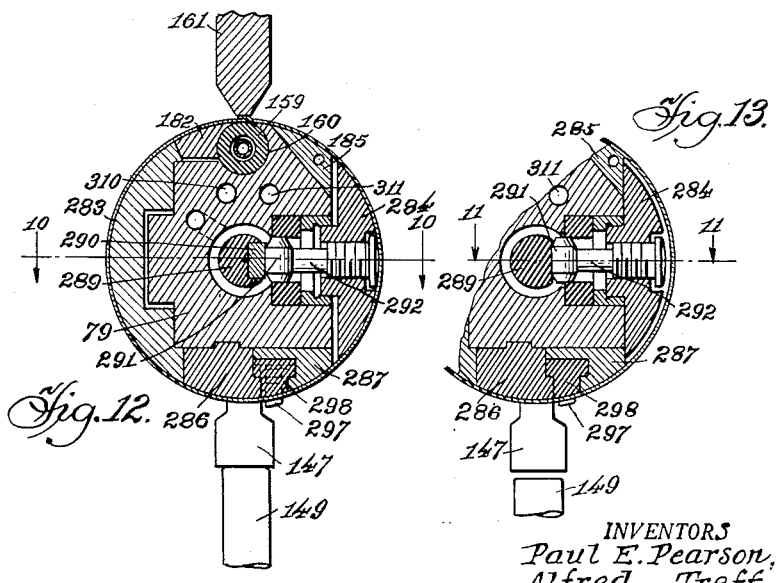

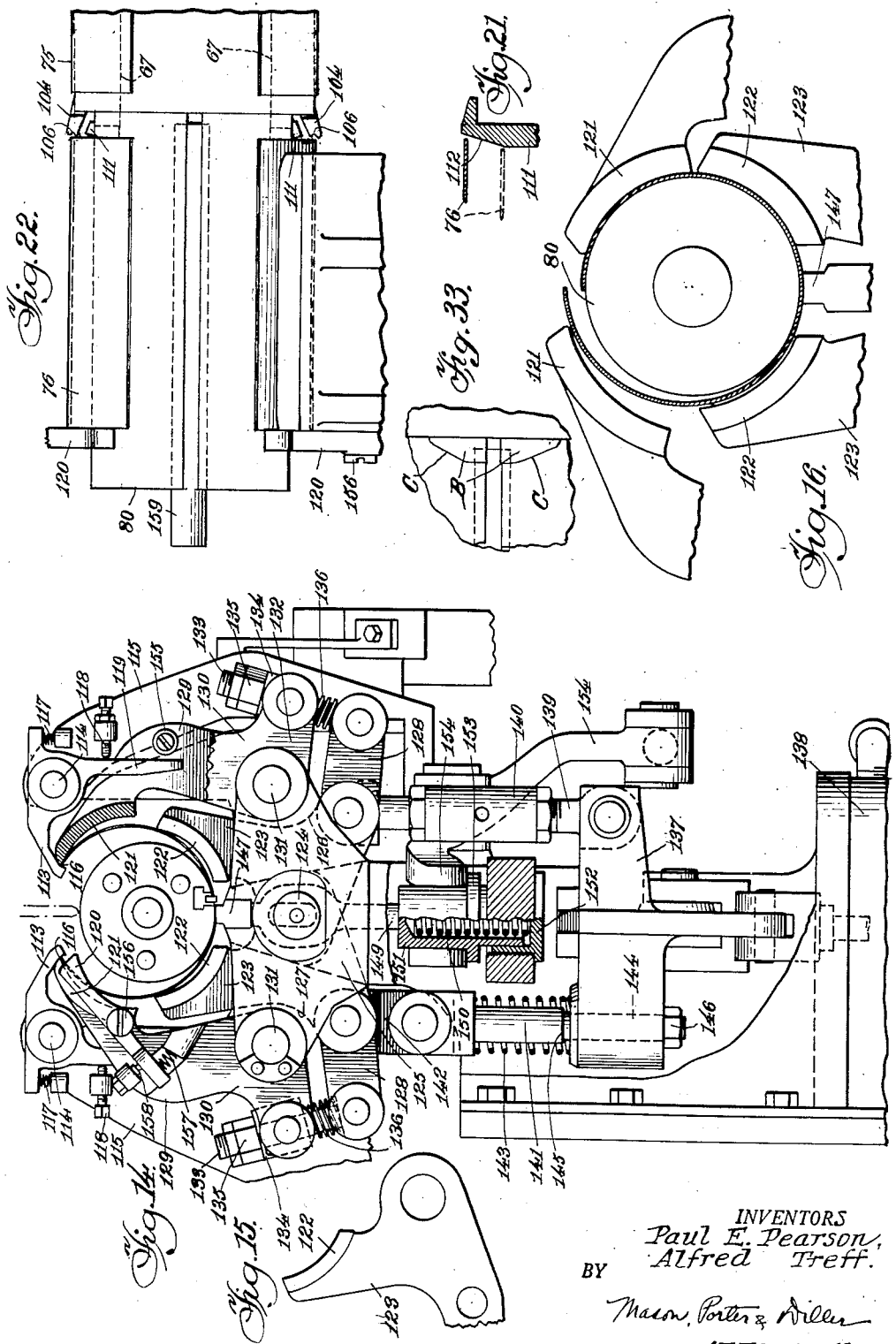

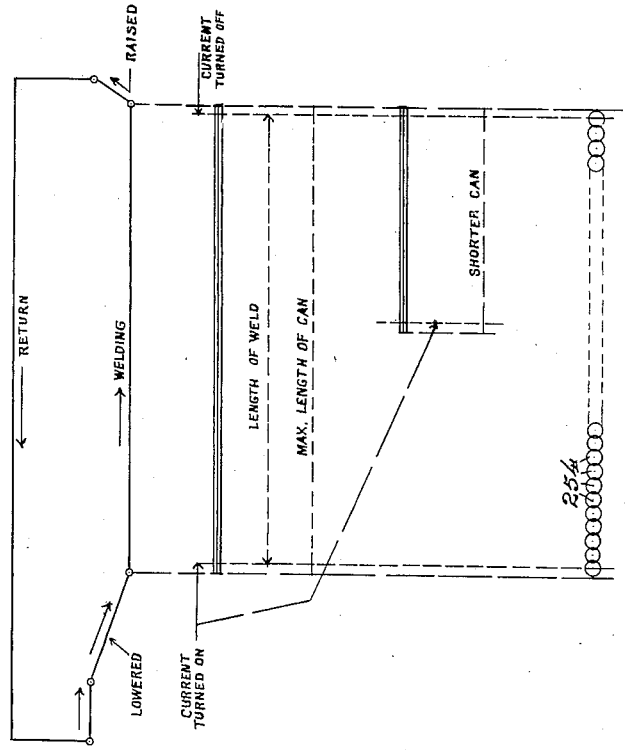
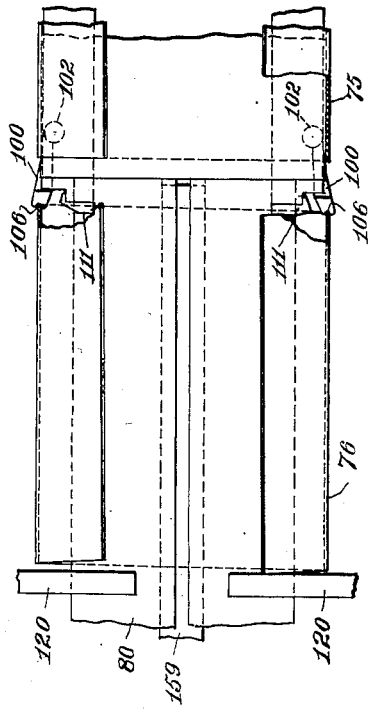
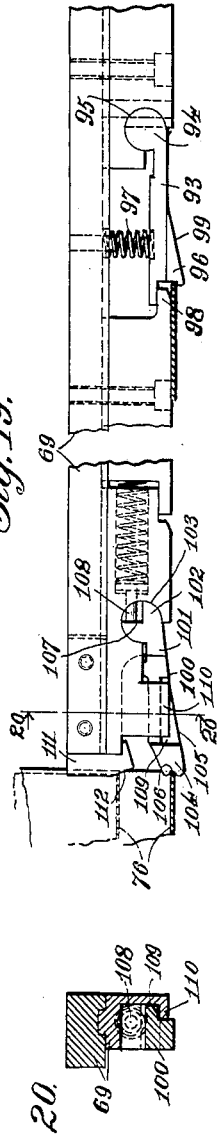

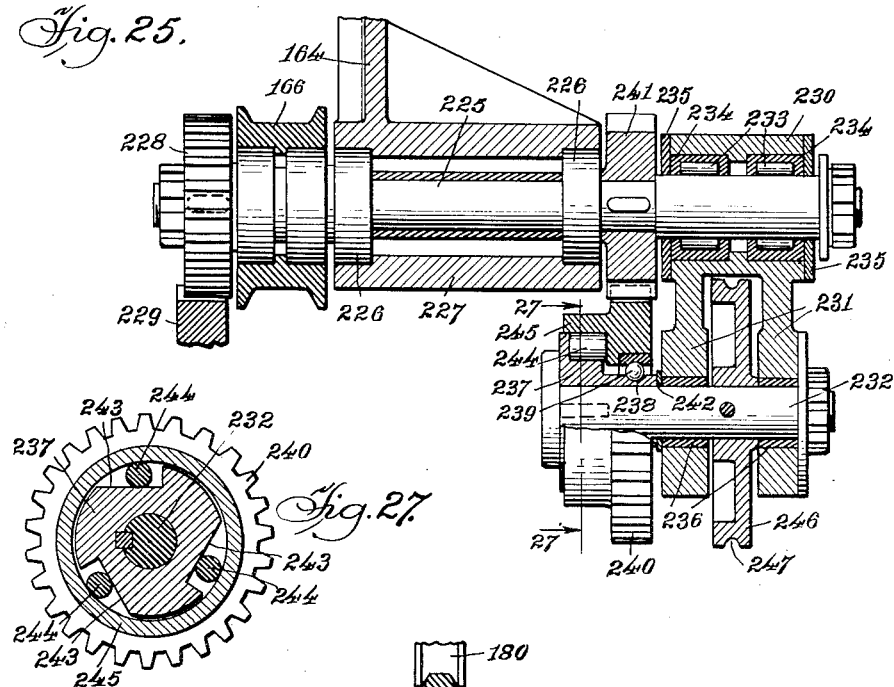
Fig. 25.
Fig. 27.
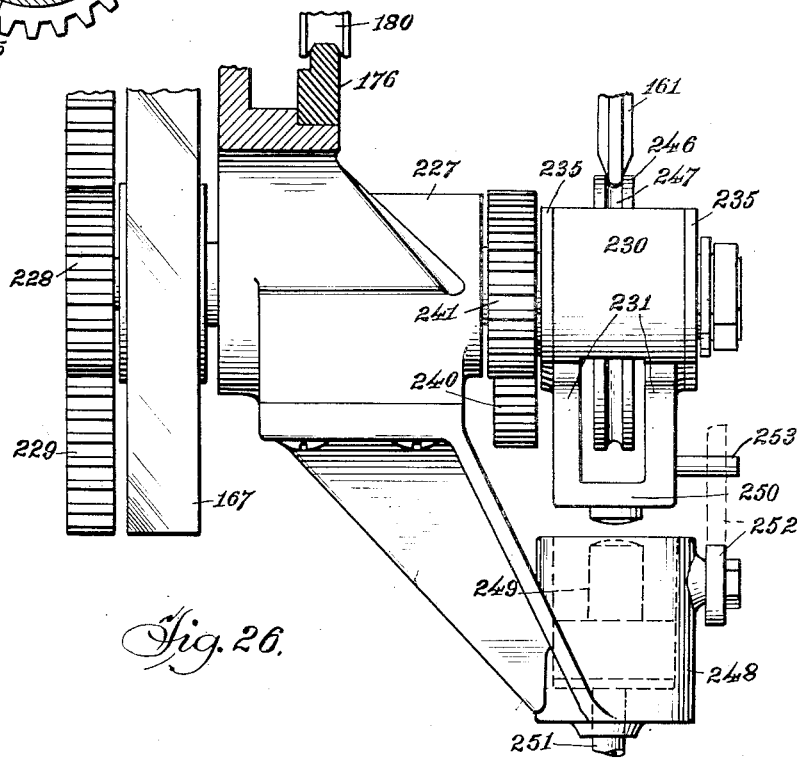
Fig. 26.

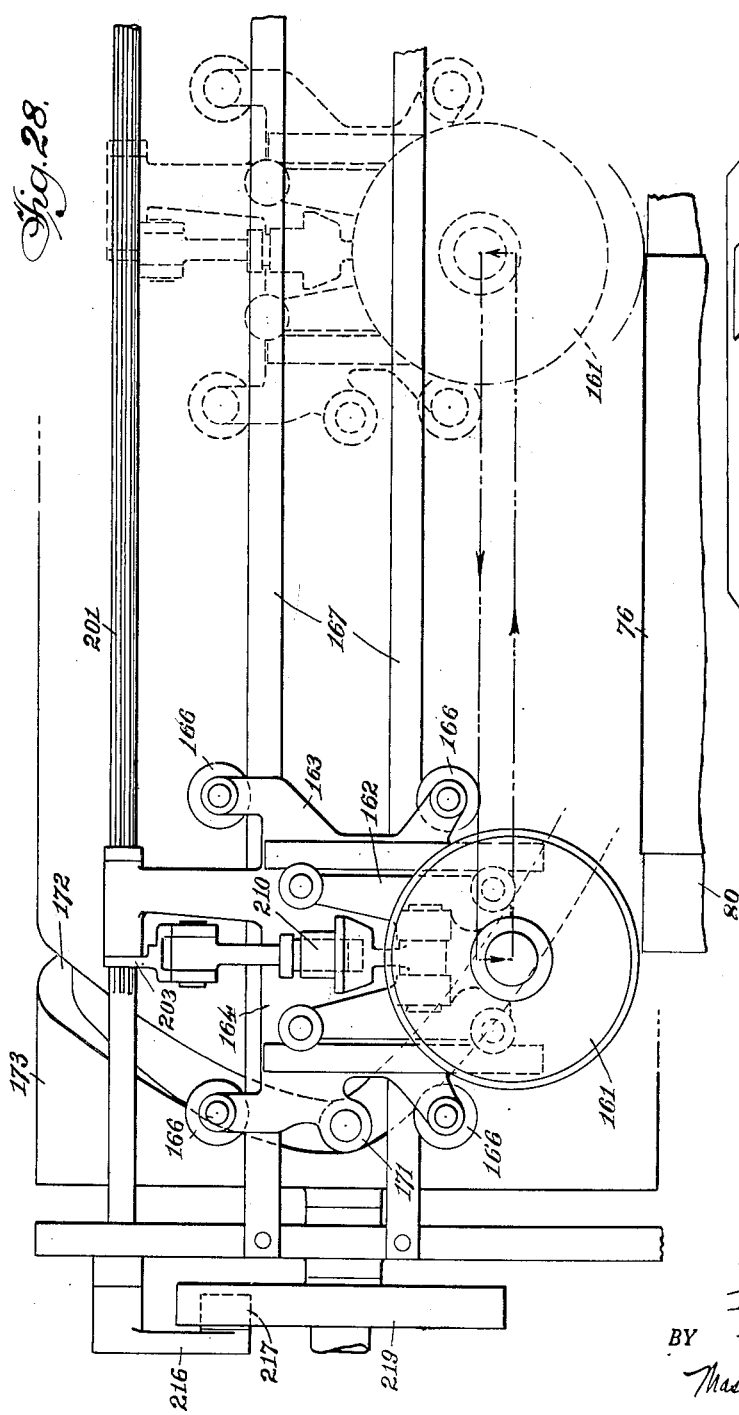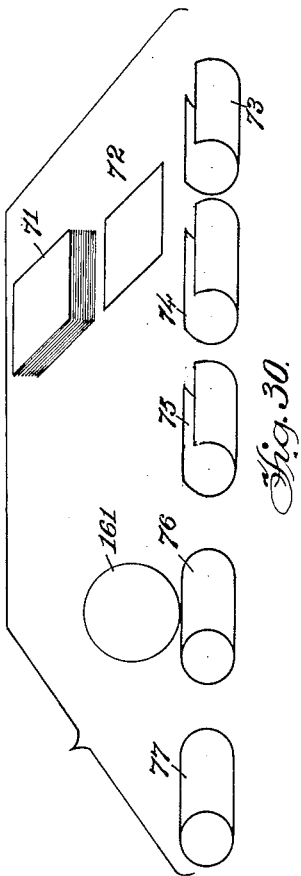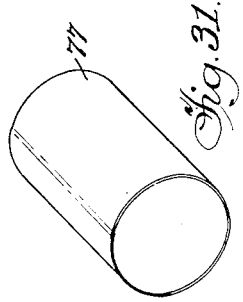

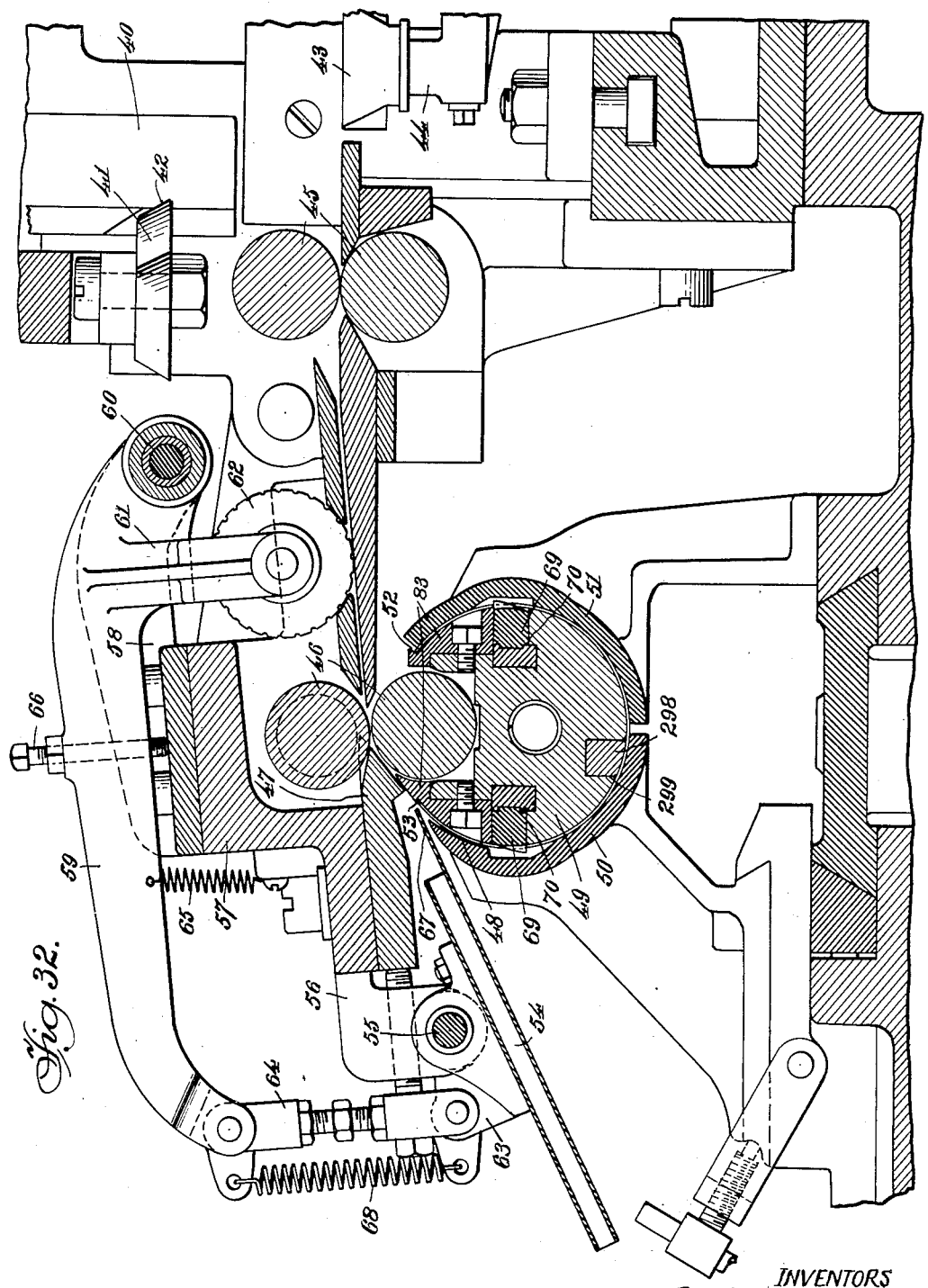

Patented Dec. 18, 1951

2,578,832

UNITED STATES PATENT OFFICE 2,578,832

CAN BODY WELDING MACHINE, INCLUDING MOVABLE AND ROTATABLE ELECTRODE

Paul E. Pearson, New York, N. Y., and Alfred Treff, Chicago, Ill., assignors to Continental Can Company, Inc., New York, N. Y., a corporation of New York Application November 5, 1945, Serial No. 626,678

18 Claims. (Cl. 219—6)

This invention relates to welding machines and particularly to machines for forming can bodies and welding the side seams thereof.

A machine of the type herein described and claimed comprises generally an elongated horn having a rolling station at one end thereof and a welding station at the opposite end, means for feeding blanks to the rolling station where they are rolled about the adjacent portion of the horn, means for feeding the rolled blanks along the horn to the welding station, means associated with the welding station of the horn to wrap the rolled blanks tightly and smoothly about the horn with overlapped edges, means for welding the overlapped edges, and means for ejecting the can bodies after the said edges have been welded.

An object of the invention is to provide an improved machine of the character mentioned which will quickly and accurately form can bodies with uniformly and efficiently welded side seams.

Another object of the invention is to provide improved means at the rolling station to eject double blanks from the machine before reaching the horn, should more than one blank at a time be delivered to said station.

Another object of the invention is to provide improved means for feeding the rolled blanks to the welding horn, and for truing the edges into accurate register at their ends prior to welding the side seam.

Another object is to provide improved wings and improved means for actuating the same so as to smoothly and tightly wrap the blank about the horn at the welding station.

Another object of the invention is to provide improved means for controlling the movement and the operation of a movable electrode with relation to the seam to be welded so as to completely weld the seam from end to end without having excess metal from the weld extending beyond the end edges of the can body.

Another object of the invention is to provide a rolling electrode in combination with novel means for actuating the same, and for automatically opening and closing the welding circuit connected therewith.

A still further object is to provide in a rotary, reciprocatory electrode, novel means for maintaining a constantly uniform pressure of the electrode upon the work.

Further objects of the invention are to provide means for automatically controlling the current to the electrodes so as to accurately confine the welding to the desired extent on the overlapped edges; and to provide means for adjusting said automatic control so that the device shall be adaptable to welding cans of different sizes.

With the above and other objects in view that will hereinafter appear, the nature of the invention will be more clearly understood by reference to the following detailed description, the appended claims, and the several views illustrated in the accompanying drawings.

In the drawings:

Figure 1 is an end elevation of a welding machine embodying the invention, the same being taken from the discharge end.

Figure 2 is a detail perspective view of a portion of the switch mechanism for automatically closing and opening the welding circuit connected with the electrodes.

Figure 4 is a fragmentary vertical section taken on the line 4—4 of Figure 3, upon a still larger scale.

Figure 5 is a fragmentary side elevation showing the complete horn, but divested of most of the associated parts.

Figure 6 is a cross-section on the line 6—6 of Figure 5.

Figure 7 is a longitudinal section on the line 7—7 of Figure 6.

Figure 10 is a horizontal section taken on the line 10—10 of Figure 8, illustrating the horn expanded, as a welding operation.

Figure 11 is a view similar to Figure 10 with one side of the horn in collapsed position, preparatory to removal of the welded can body.

Figure 12 is a transverse section taken on the line 12—12 of Figure 10.

Figure 13 is a similar section taken on the line 13—13 of Figure 11.

Figure 14 is an end elevation of the welding horn, the wings and wing actuating mechanism, parts being broken away and in section.

Figure 15 is a detail of one of the wing sections.

Figure 16 is a fragmentary somewhat diagrammatic end view illustrating the action of the wings in folding or wrapping the can body blank about the horn.

Figure 17 is a fragmentary somewhat diagrammatic plan view illustrating the blank as it reaches the welding station and before the edges are trued, that is, accurately aligned.

Figure 18 is a detail end view illustrating the body blank in the process of being trued.

Figure 19 is a detail view illustrating portions of the feeding and the truing means.

Figure 20 is a detail section taken on the line 20—20 of Figure 19.

Figure 21 is a detail fragmentary sectional view illustrating the action of the truing means.

Figure 22 is a fragmentary somewhat diagrammatic plan view illustrating the can blank in trued position at the welding station before the wings have folded or wrapped the blank about the horn.

Figure 23 is a detail horizontal section taken on the line 23—23 of Figure 3.

Figure 24 is a detail perspective view of a portion of the mechanism for lowering and raising the movable electrode.

Figure 25 is an enlarged detail section taken on the line 25—25 of Figure 3.

Figure 26 is a fragmentary horizontal section illustrating in plan view the parts shown in Figure 25.

Figure 27 is a detail sectional view of a ratchet mechanism forming part of the combination illustrated in Figures 25 and 26, the section being taken on the line 27—27 on Figure 25.

Figure 28 is a diagrammatic side view illustrating the cycle of movement of the movable electrode.

Figure 29 is a diagram illustrating the welding cycle.

Figure 30 is a diagrammatic perspective view illustrating the several stages in the formation of a can body and the welding of the side seam thereof.

Figure 31 is a perspective view of a finished can body.

Figure 32 is an enlarged vertical cross sectional view of the machine at the rolling station.

Figure 33 is a fragmentary plan view illustrating a modified form of truing means.

Figure 3:
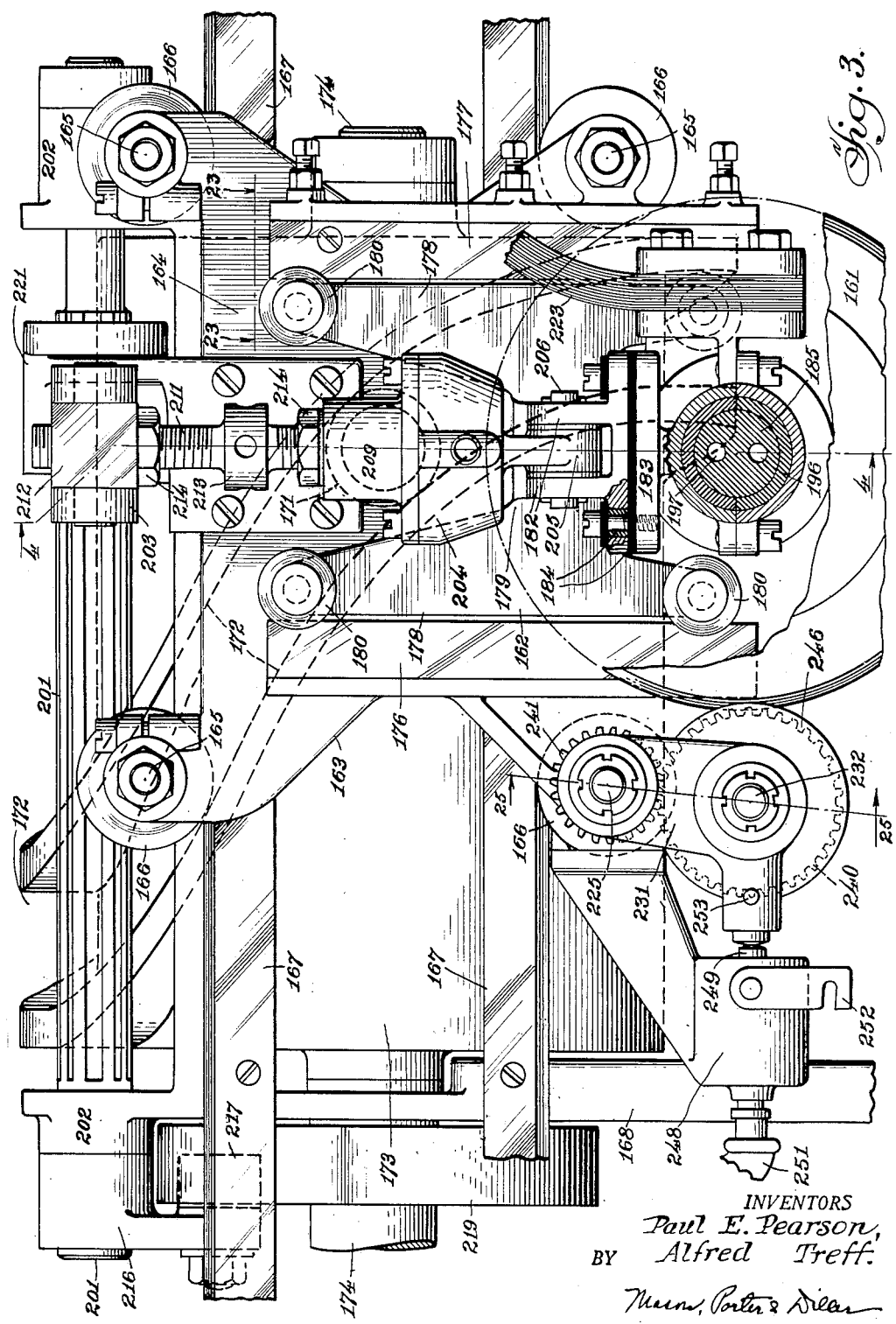
Figure 3 is a fragmentary side elevation, upon an enlarged scale, illustrating the movable electrode carriage, the view being taken at 3—3 on Figure 1, looking in the direction of the arrows.

Referring now to the drawings, and particularly to Figure 32 which illustrates the rolling station and the first stage in the making of a can body, 40 indicates the magazine or hopper in which the cut blanks are stacked with their lower edges resting upon supports 41, said supports having downwardly and inwardly bevelled edges 42 to facilitate removal of the lowermost blank from the stack. Below the hopper 40 are means for removing the blanks one at a time from the stack and delivering them to the rolling mechanism. This means comprises a plurality of suction or vacuum cups 43 (one only being illustrated) mounted upon an arm 44 to which is imparted upward and downward and forward and backward movement by mechanism not shown, as such mechanism forms no part of the present invention as claimed herein. The cups 43 are caused to rise into contact with the lowermost blank in the hopper, air is exhausted to produce the necessary vacuum, and the cups are then lowered to the level shown in Figure 32, pulling the lowermost blank from the stack. A forward movement is then imparted to the cups to deliver the blank to the feed rollers 45, the cup in the drawing being shown at the limit of this movement. As soon as the rotating rollers take hold of the blank the vacuum is relieved, and the cups are retracted or moved backward ready to remove another blank from the hopper and feed it to the rollers. The rollers feed the blank laterally to the forming rollers 46 which force the same against a braking steel 47, which assists the rollers in curling the blank and guides the same into a space 48 between the substantially cylindrical end of a horn 49, hereinafter described more fully, and a shell surrounding the same and composed of separable half sections 50 and 51. This serves to partially preform the can body, but with the edges thereof spaced apart in the manner shown at the right in Figure 30. The curled blank is then fed endwise toward the welding end of the horn, which is more fully described hereinafter. It should be noted that the horn at the forming or rolling station is provided with a stop shoulder 52 on the side opposite to that where the blank enters the space 48, and at the side where the blanks enters, with a shoulder 53 under which the following edge of the blank engages, thereby keeping the blank properly positioned with relation to the horn with the lateral edge portions thereof subsequently to be overlapped and welded to form a side seam spaced apart in the manner indicated at the right in Figure 30.

Should the vacuum cups remove more than one blank at any given time from the hopper and feed the improperly extracted multiple blanks to the mechanism above described, means are provided for ejecting the double blanks from the machine before they can enter the space 48 of the horn. To this end a discharge chute 54 is pivotally mounted as at 55 upon a bracket 56 on the forming roller housing 57. Also mounted on the housing 57 is a bracket 58 upon which a lever 59 is pivotally mounted, as at 60, said lever 59 having an arm 61 carrying a detector roll 62 located between the feed rollers 45 and the forming rollers 46, and in the path of movement of the blanks from said rollers 45 and the rollers 46. The free end of the lever 59 is connected to an ear 63 on the pivoted chute by an adjustable link 64. A spring 65 normally keeps the lever 59 depressed and the inner end of the chute raised as illustrated in Figure 32 of the drawing. A set screw 66 threaded through the lever 59 limits the downward movement of said lever and controls the normal spacing between the roll 62 and the underlying feedway surface. The link 64 may be adjusted to properly place the chute 54 with relation to the roll 62 and the horn structure space 48.

Should a double blank be fed to the machine, the additional thickness thereof will raise the detector roll 62 and lever 59 thereby depressing the inner end 67 of the chute beneath the shoulder 53, and the double blank will be ejected from the machine. A spring 68 ensures proper depressing of the chute end 67 when the free end of the lever 59 is raised and holds the end 67 in place with yielding pressure against the horn.

After the blanks are rolled and placed in the manner above described, reciprocating finger bars 69 arranged in longitudinal slideways 70, move the blanks intermittently forward toward the welding end of the horn. In moving from the rolling station to the welding station, the blanks pass through two idle stations, as illustrated diagrammatically in Figure 30 of the drawings. In said figure, 71 indicates the blanks stacked in the hopper, 72 a blank being moved from the stack to the rolling station as above described, 73 a blank after having been rolled at the rolling station, 74 and 75 the blank at the two idle stations respectively on the way to the welding station, 76 the blank at the welding station and in process of being welded, and 77 the welded can body as ejected from the machine. The completed can body with its welded side seam is shown in Figure 31.

This progression of the blank along the horn from station to station is more clearly disclosed in conjunction with the horn in Figure 5 of the drawings. As shown in Figures 5, 6 and 7, the horn comprises a supporting casting or body portion 78 having an integral forward extension 79 which constitutes the core of the welding horn 80; and a rearwardly extending casting 81 secured to the rear face of the body portion 78, a portion 82 of which, adjacent the rear end, constituting the core of the horn at the rolling station. The casting 81 is substantially the same in cross section throughout its length, that is cylindrical except at the upper portion which is cut away so as to provide a space at the rolling station 82 for the previously mentioned lower forming roller 46. See Figure 32. At the rolling station, longitudinal bars 83 are secured to the upper face of the casting upon each side of the roller 46, and have formed thereon the shoulders 52 and 53 hereinbefore mentioned. These bars complete the cylindrical surface from shoulder to shoulder. The portion of the casting 81 between the rolling station and the body 78 is provided on its upper face with similar bars 84 having longitudinal shoulders 85 in alignment with the shoulders 52 and 53.

The lower portion of the casting 78 of the horn is substantially rectangular in cross section, and secured to the same are side plates 86, a bottom plate 87 and a pair of longitudinal bars 88 having shoulders 89 in alignment with the shoulders 52, 53 and 85 hereinbefore mentioned. The outer faces of the members 86, 87 and 88 are shaped to give a cylindrical form to this portion of the horn. By this construction the lateral edges of the rolled blank are maintained separated as the blank is moved along the horn by the finger bars 69 so as to pass at opposite sides of the upper portion of the supporting casting 78 and be delivered in proper position to the welding station. Flanges 90 are provided at the upper end of the casting 78 for securing the horn in position on the frame of the machine, and a pedestal 91 is arranged to support the rear end of the horn adjacent the rolling station. Thus the horn as a whole is supported by the flanged portion of the casting 78 adjacent the forming and welding station, and by the pedestal adjacent the rolling station.

Each of the finger bars 69 is provided with three pivoted fingers arranged in recesses in the bar and having a portion of their free ends projected outwardly into the path of the blanks. These fingers are spaced on the bar a greater distance apart than the length of the longest can for which the machine is designed, so as to give sufficient space between the ends of successive can blanks for proper action of the fingers. The first two of these fingers, which feed the rolled blank from the rolling station to the two idle stations, are similar, and one of these, with portions of a bar 69, is illustrated in Figure 19. As shown therein, each of said fingers comprises an elongated portion 93 formed with a cylindrical end 94 mounted in a cylindrical socket 95, and a can engaging detent 96 at its free end which projects beyond the laterally presented edge of the finger bar into the path of the can blanks. A spring 97 normally projects the finger outwardly, and a stop 98 on the bar limits the outward movement of the finger. The outer edge 99 of the detent is beveled or rearwardly inclined so as to depress the finger upon engaging the next succeeding can blank on the rearward movement of the bar 69, and permit it to pass said can and be projected outwardly to engage behind the can ready to move the same forwardly.

It will be apparent by reference to Figure 19 that the finger 100, at the forward end of the finger bar 69, is designed to move the can blank into the welding station, and this finger comprises an elongated portion 101 having a cylindrical end 102 mounted in a cylindrical socket 103, and a can engaging detent portion 104, the outer edge 105 of which is rearwardly inclined in the same manner and for the same purpose as the edge 99 of the detent 96. The forward end of the detent 104 projects beyond the forward end of the finger bar 69 and is formed with a shallow notch 106 which engages the edge of the can blank and remains in engagement therewith while the blank is being folded or wrapped about the welding horn until said edge of the blank engages a truing device hereinafter described. The cylindrical end 102, inwardly of the axis thereof, is provided with a socket 107 to receive the end of a spring pressed plunger 108 which normally projects the finger outwardly with the notch 106 in position to engage the rear edge of the can blank. One side of the finger 100 is undercut as at 109 to receive an inwardly extending stop 110 on the bar 69 to limit the outward movement of the finger. See Figure 20. This construction also allows a slight retraction of the detent 104 as the edge of the can blank passes therefrom inwardly to the truing device.

After the can blank is moved into the welding station, suitable wings wrap the blank about the horn with the edges thereof overlapped; and it will be apparent that the radius of the welding horn is much less than that of the horn at the preceding stations. These relative dimensions are clearly shown in Figure 18.

Although the guide shoulders 52, 53, 85 and 89 keep the blank in substantially proper position as it is fed along the horn, it is essential that the blank be perfectly trued after reaching the welding station and before welding, so that the edges when overlapped shall register true at the ends to avoid any projections which might interfere with the subsequent attachment of end closures through the medium of the usual seaming operations.

For this purpose, retractable guides are arranged as continuations of the guide shoulders above mentioned, abutments are provided as stops, for the forward ends of the blank when it reaches the welding position, and the truing devices hereinbefore mentioned are arranged on the ends of the finger bars 69 to push the blank evenly against both abutments as the wings wrap the blank about the horn. The truing devices comprise beveled cam blocks 111, the beveled faces 112 of which lie in the path of movement of the rear edges of the blank as it is folded inwardly by the wings, hereinafter described, and as illustrated in Figures 17, 19 and 21, and cams the blank edges into trued position. Figure 17 shows a blank as delivered to the welding station, and out of true, this being exaggerated over normal to more clearly illustrate this feature of the invention.

The retractable guides for the edges of the blanks are illustrated in Figures 1, 5 and 14, and comprise overhanging members 113 pivotally mounted as at 114 on brackets 115 extending upwardly from the frame of the machine. The overhanging guide members 113 extend longitudinally above the horn for substantially the width of the can blank, and the under faces thereof at the free edges are formed with downwardly disposed portions constituting guides 116 for the edges of the blank, in alignment with the guides 52, 53, 85 and 89 heretofore mentioned. Spring means 117 normally keeps each guide end 116 yieldingly depressed, and set screws 118 on the brackets 115 engage downwardly extending fingers 119 on the guides to limit the downward movement, and to provide means for adjusting the guide into alignment with said other guide shoulders on the horn. The stops for limiting the movement of the blank when it reaches the welding position are indicated at 120, and are pivotally mounted on the forward edges of the wing sections as will be presently described.

The wings for wrapping the blank about the welding horn are arranged upon each side thereof, and each comprises an upper section 121 and a lower section 122, and novel means are provided to actuate said sections in sequence so as to wrap the blank firmly and smoothly about the horn. This portion of the machine and its operation is best illustrated in Figures 14 and 16, and for the purpose of clearness of description, the wings will be referred to as right hand and left hand wings, reference being made to the figures referred to.

The lower wing sections 122 together form a trough like guide for the lower portion of the blanks as they pass into the welding station. Each section 122 is formed upon the end of arms 123 of bell-crank levers pivotally mounted upon a pin 124 carried in a bracket 125 secured to the frame of the machine. The bell-crank levers of the right hand lower section of the wing are indicated at 126, and those of the left hand section at 127. The lower arms 128 of the bell-crank levers 126 and 127 extend laterally in opposite directions and are connected to novel actuating means.

The upper wing sections 121 are formed upon upwardly and inwardly curved arms 129 of bell-crank levers 130 pivotally mounted on pins 131 in the bracket 125. The short lower arms 132 of the levers 130 extend outwardly above, and substantially parallel with the arms 128 of the lower wing sections. Threaded links 133 are pivotally connected to the ends of arms 128 and pass upwardly through blocks 134 pivotally mounted at the ends of the arms 132, and threaded on said links are nuts 135 whereby relative normal positions of the upper and lower sections may be nicely adjusted. Between the ends of said arms are mounted compression springs 136.

Connected to the arms 128 of the lower jaws, and intermediate the ends thereof, are downwardly extending links which are connected to a cross-head 137 actuated by a fluid pressure cylinder 138. The link 139 connecting the right wing section to the cross-head is pivotally fixed at its respective ends to both the lever and the cross-head, but is adjustable in length through the medium of the turn buckle 140. The link connecting the lever of the left lower wing section to the cross-head comprises a rod 141 having a limited slidable connection with the cross-head, a pivoted link section 142 connecting the upper end of the rod with the arm 128, and a spring 143 normally tending to elevate said rod. The lower end of the rod is reduced in diameter as at 144 to slidably extend through a bore in the cross-head and to form a shoulder abutment 145.

The operation of the wings is as follows: When the blanks have reached the welding station and are ready to be trued, as hereinbefore described, fluid under pressure is admitted to the cylinder raising the cross-head 137. A positive pressure is thereby imparted to the arm 128 of the lower right wing section and swings said section inwardly toward the horn. This movement also imparts an initially yielding pressure to the arm 132 of the upper right wing section causing the same to follow rapidly the movement of the lower right section. On the left side, the shoulder 145 on the rod 141 being slightly above the cross-head permits the cross-head to rise a short distance before imparting positive movement to the arm 128 of the lower left wing section, thereby retarding the action of this latter section until the right hand sections are closing on the horn. A nut 146 threaded upon the lower end of the rod 141 permits an adjustment of the time of this lag to the extent desired. The closing of the upper wing section follows the lower wing section as on the right side. By this method of having the wing sections come into action successively, and from the center of the blank outwardly to the edges, the blank is wrapped firmly and smoothly about the horn with the left hand edge lapped over the right hand edge as viewed in Figures 14 and 16.

During the initial movement of the wing sections, the can blank is trued as hereinbefore described, and after the blank has been trued, and before the wings have pressed the blank into engagement with the horn, a clamping bar 147 is firmly pressed against the bottom of the blank to hold the same firmly, in trued position, during the completion of the wing movements and during the subsequent welding operation. This bar is in constant contact with the blank during the welding operation, and it is normally held in engagement with the horn under slight pressure imparted thereto by springs 148 located between said bar and the bracket 125. This permits the blank to be pushed between the bar and the horn without appreciable resistance.

When the can is in position for welding, a plunger rod 149 is forced into engagement with the clamping bar by the release of a pressure spring 150. See Figure 14. This spring is arranged in telescoping members 151 and 152, the former being formed upon the lower end of the plunger rod 149, and the latter in threaded connection with the frame of the machine, whereby the pressure of the spring can be adjusted to regulate the clamping action of the bar 147. The member 151 is provided with an external annular flange 153 which is engaged by a cam bar 154 for depressing the same and relieving the pressure of the bar 147 on the can. When pressure is to be applied to the bar the cam lever is raised, as will be apparent.

As the upper wing sections move inwardly it is necessary to disengage the overhanging guides 116 from the edges of the blank. To this end the arms 129 of the wing levers are provided with trips 155 which engage the depending fingers 119 and raise the guides 116 out of engagement with the blanks, thereby permitting the same to be swung inwardly by the wings. The stops 120 remain in engagement with the end edges of the blank until the blank is completely wrapped on the horn. These stops are pivotally mounted as at 156 and swing back as the wing sections close upon the horn, by engaging the horn ahead of the wing, as will be apparent by reference to Figure 14. Springs 157 hold the stops 120 in operative position, and permit the retraction thereof as described, and an adjustable stop 158 is provided to limit the inward movement of the operative end of each said stop.

Figure 8:
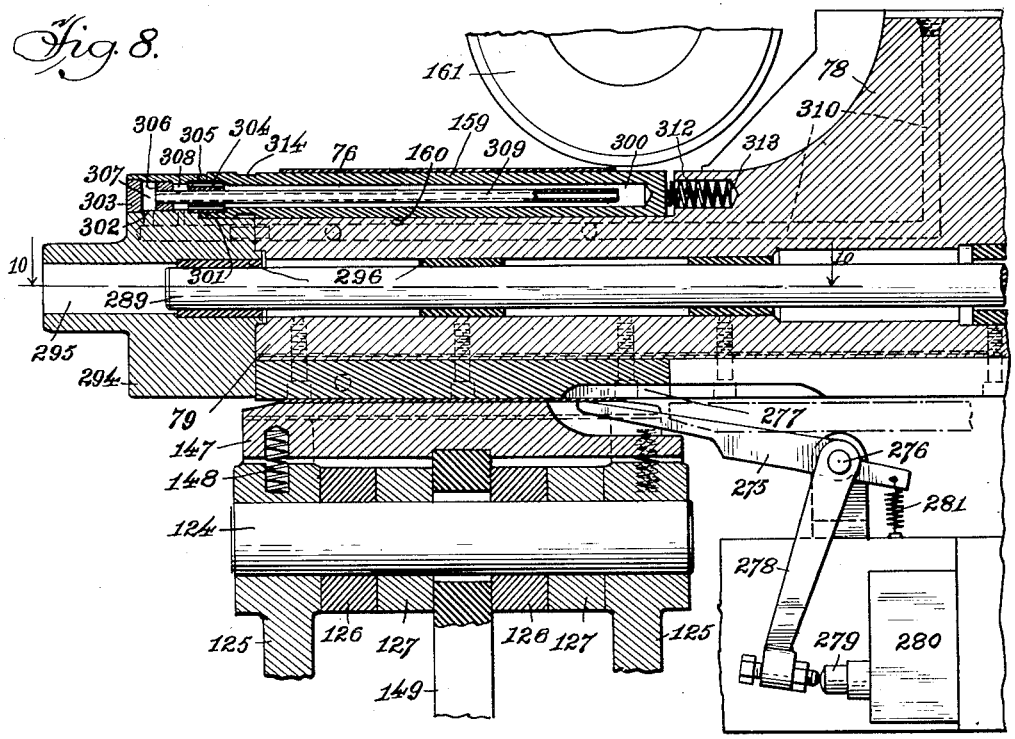
Figure 8 is a fragmentary vertical longitudinal section illustrating the horn at the welding station, and showing some of the associated parts.
Figure 9:
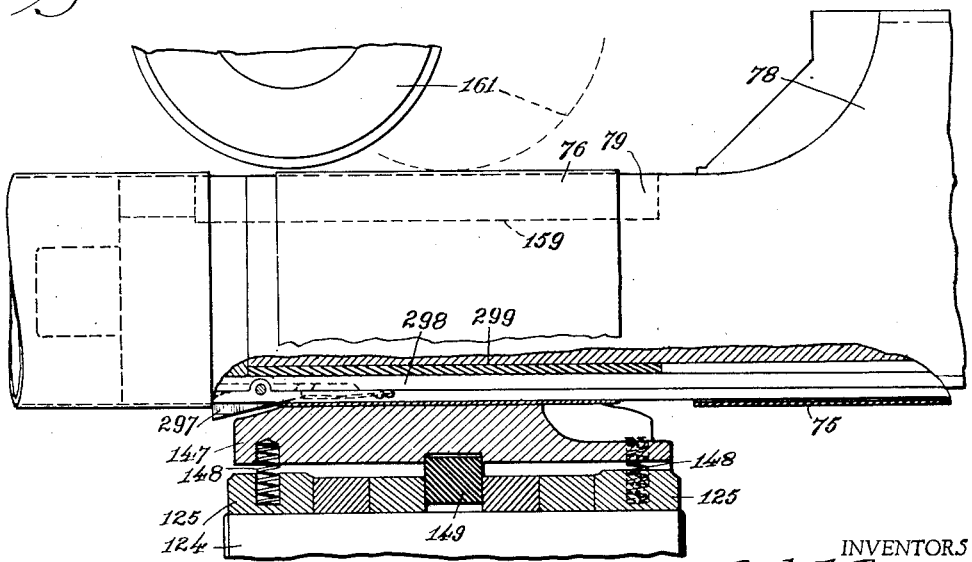
Figure 9 is a side elevation illustrating the parts shown in Figure 8, parts being broken away and in section.

After a blank has been trued, clamped and wrapped at the welding station, with the edges overlapped, said edges are welded by passing a rotary or movable electrode along said overlapped edges, there being a fixed electrode extending longitudinally of the horn beneath said overlapped edges. It will be apparent by reference to Figures 8 and 12 that this stationary or fixed electrode comprises a tubular member 159 mounted in a longitudinal groove 160 provided in the upper face of the welding section of the horn as shown in Figures 8, 12 and 18 and which will be described more specifically hereinafter. Current from the transformer, not shown, is supplied through a lead L connected to the horn section 78.

The movable electrode comprises a copper wheel having a shaft rotatably mounted in bearings on a vertically reciprocable cross-head carried by a carriage which is mounted for horizontal reciprocation on the frame of the machine. Referring particularly to Figures 3, 4 and 28 of the drawings, 161 indicates the movable electrode, 162 the cross-head upon which the same is rotatably mounted, and 163 the carriage which carries the cross-head.

The carriage 163 comprises a substantially flat vertical body portion 164 provided at the upper and lower corners thereof with rearwardly extending stud shafts 165 upon which are mounted grooved rollers 166 having rolling contact with horizontal tracks 167 secured to the main frame 168. Secured to the body portion 164, preferably at or adjacent the center thereof, is a sleeve 169 carrying a stud shaft 170 upon the end of which is mounted an anti-friction roller 171 engaging in a cam groove 172 of a drum cam 173. In Figure 28, which is merely diagrammatic, this roller is illustrated at one side of the carriage, so as not to confuse the illustration as to the relation of the carriage and cross-head with its actuating means.

The drum cam 173 is mounted on a shaft 174 driven by gearing 175. See Figure 1. The cam groove 172 is designed to give the proper horizontal reciprocation to the carriage 163, as will appear more fully hereinafter. Carried by the carriage 163 is a pair of vertical tracks or guides for the cross-head 162. One of these tracks, 176 is fixed to the carriage, whereas the other track 177 is adjustably mounted thereon as shown in Figure 3.

The cross-head 162 comprises a pair of vertical side portions 178 connected by a cross-bar or intermediate portion 179. The portions 178 are arranged adjacent the tracks 176, 177 and carry at their ends grooved rollers 180 which travel on said tracks. Carried by the intermediate portion 179, and preferably integral therewith, is a bracket comprising a horizontal portion 181 and a pair of spaced vertical ears 182. Mounted on the horizontal portion 181 of the bracket is a bearing block 183 for the rotary electrode 161. This bearing block is insulated from the bracket by insulation 184.

The rotary electrode structure includes an elongated hub or shaft 185 preferably formed of copper and having a flange or disk 186 adjacent its outer end, an outer hub cap 187, and an annular copper electrode proper 188, which is clamped between the disk 186 and the hub cap 187. The parts are designed to provide a space 189 between the flange 186 and the hub cap 187, and a space 190 between the end of the shaft and the cap for a cooling medium, and ducts 191 in the hub cap 187 provide a communication between said spaces.

The inner end of the shaft 185 extends into bearings 192 having an annular duct 193, said bearings being arranged in a housing 194 secured to the block 183. An inner hub cap 195 is secured to the housing 194 and encloses the inner end of the shaft 185. The shaft is provided with a longitudinal duct 196 extending from end to end thereof and forming a communication between the interior of the hub cap 195 and the space 190 in the outer hub cap 187. Another longitudinal duct 197 is provided in the shaft 185 which is in communication at one end with the annular duct 193 and at the other end with the space 189 within the circular electrode. An inlet port 198 is provided in the hub cap 195, and an outlet port 199 in the housing 194 communicating with the annular duct 193. See Figure 4. These ports are connected as at 200 with flexible conduits leading from and to a source of supply for the cooling medium. See Figure 1. The path of the cooling medium is indicated by arrows in Figure 4 of the drawings.

The cross-head and the circular electrode 161 carried thereby are raised and lowered in operation by the following means. Extending longitudinally of the machine is a shaft 201 supported in bracket 202 on the frame 168, and mounted on said shaft is a lever 203 which extends forwardly with its end over the bracket 181 of the cross-head 162. See Figures 1, 3, 4 and 24. Connected to the bracket is an air cylinder 204 having a depending lug 205 pivotally mounted between the ears 182 on a pin 206. The cylinder 204 is provided with a piston 207 having a reduced portion 208 extending upwardly through a sleeve 209 mounted on the cylinder head 210.

Threaded into the extension 208 of the piston is a stem 211, the upper end of which is reversely threaded through a block 212 pivotally mounted in the bifurcated end of the lever 203. This screw is provided with a wrench receiving head 213 and lock nuts 214. The lever 203 is in splined connection with the shaft 201 as indicated at 215, so as to travel with the carriage 163 as it is reciprocated by the cam 172.

Fixed to one end of the shaft 201 is a lever 216, the end of which is equipped with a laterally offset anti-friction roller 217 engaging in an eccentric cam groove 218 in a cam member 219 fixed on the shaft 174. With this construction, the cross-head will be raised and lowered with each revolution of the shaft 174, and the carriage 163 simultaneously reciprocated from end to end of its welding stroke and returned.

A bracket 220 fixed to the body 164 of the carriage has a sleeve 221 associated with the hub of the lever 203 which moves the lever along the shaft 201, thereby relieving any lateral strain on the cylinder 204 and associated parts.

A flexible air tube 222 is in communication with the cylinder 204 below the piston 207, and air is intermittently admitted thereto by a cam controlled air valve as will be more specifically described hereinafter.

A flexible lead 223 is fixed to the bearing block 183 and electrically connects the movable electrode 188 with a transformer, not shown. See Figure 3.

Novel means are provided for rotating the circular electrode 188 and preventing the same from mushrooming. See Figures 3 and 25 to 27. To this end the shaft 225 of the lower left hand roller 166 of the carriage is rotatably mounted in bearings 226 arranged in a sleeve 227 formed on the carriage. Fixed to the end of the shaft 225 and adjacent the roller 166, is a pinion 228 which engages a rack 229, fixed to and extending longitudinally of the frame. The shaft 225 extends forwardly beyond the end of the sleeve 227, and swingingly mounted on said shaft end is a bracket 230 having depending arms 231 in which is mounted a shaft 232. Roller bearings 233, having insulating cages 234 are provided on the shaft 225 for the bracket 230, and insulating washers or disks 235 are arranged on the shaft at the sides of the bracket as shown in Figure 25. Insulating bearings 236 are also provided for the shaft 232.

Fixed to the rearwardly projecting end of the shaft 232 is a fixed element 237 of a clutch, which element is also provided with a ball race 238 for ball bearings 239 upon which is mounted a spur gear 240 meshing with a gear 241 keyed to the shaft 225 between the end of the sleeve 227 and the swinging bracket 230. An insulating washer 242 is provided between the clutch element and the adjacent bracket arm 231. The clutch element is provided with a plurality of inclined faces 243 and associated rollers 244 to cooperate with a flange 245 on the gear 240. Fixed to the shaft 232, between the arms 231 of the bracket, is a wheel 246 having a peripheral groove 247 disposed to engage the peripheral edge of the circular electrode 188. It will be evident that when the carriage is reciprocated the pinion 228 by engaging the rack 229, will rotate the shaft 225 and pinion 241, and when the carriage moves in one direction, that is with the welding stroke, the wheel 246 will be rotated through the gear 240 and the clutch, but in reverse movement of the carriage the clutch prevents rotation being transmitted to the circular electrode. Not only does the grooved wheel impart rotation to the electrode during the welding stroke, but it also serves to maintain the desired edge shape of said electrode and keep said edge from mushrooming.

To impart sufficient pressure to the wheel 246 to hold the same in operative contact with the circular electrode, an air cylinder 248, mounted upon the carriage 163, is provided with a plunger 249 which engages a yoke 250 formed on the lower end of a bracket 230. Compressed air is admitted to the cylinder 248 by means of a flexible conduit 251. When the machine is not in operation the wheel 246 may be held in retracted position by a latch 252 on the cylinder engaging a pin 253 on the yoke 250.

The welding operation is as follows. As a can blank is advanced to the welding station, the carriage 163 is retracted toward the end of the horn until the circular electrode 161 is sufficiently beyond the forward edge of the blank to permit the wings to fold the blank into position on the horn with the edges overlapped as hereinbefore described. After the blank has been folded or wrapped about the horn and clamped in position by the bar 147 and the wing sections, the carriage 163 is moved counter to the direction in which the blank was advanced, and at the same time the cross-head 162 is lowered by the lever 203 until the electrode engages the end of the overlapped edges of the can blank when the can body is of maximum length. When operating on cans of shorter lengths, the electrode 161 is lowered directly onto the lower electrode 159 and moves along the same until it rides up on the forward end of the lapped edges of the can body. See Figure 28. The electric current is then automatically turned on when the electrode 161 reaches a short distance inwardly from the end of the can, and remains on until the electrode reaches a short distance from the opposite end. During this time the wheel electrode 161 is rotated in a clockwise direction by the friction wheel 246 as before described. Preferably the peripheral speed of the electrode 161 is greater than the longitudinal speed of the carriage so as to clean the contacted surface of any grease, rust or other foreign matter and thereby assure a superior weld.

The current is turned on and off at points slightly removed from the ends of the seam so that no fused metal from the weld will be extended beyond the can body ends which would interfere with the subsequent seaming on of end closures.

In Figure 29 a diagram of the welding cycle is shown, both for the operation upon cans of maximum length and for shorter cans. The circuit is provided with a "thyratron" control, so that a plurality of overlapping spot welds are formed as indicated at 254 in Figure 29. This "thyratron" control is well known in the art of welding and is not illustrated herein. As previously stated, the current is so timed that the first and last weld will extend just to and no further than the end of the overlapping edges.

In order to turn the current on and off, a timer is mounted on the shaft 174. See Figures 1 and 2. This timing means comprises an annular guideway 255 upon which are adjustably mounted a pair of brackets 256 carrying detents 257 and 258, respectively, and which move in individual circular paths in different parallel planes. Located in the path of said detents is a trip lever 259, pivoted on a centrally disposed pin 260 and having lugs 261 and 262 on opposite sides of the pin 260 and which are engaged respectively by the detents 257 and 258. One end of the lever 259 is double beveled as at 263 to be engaged by a similarly beveled end 264 of a spring projected pawl 265. The other end 266 of the lever actuates a push rod 267 of a switch arranged in a housing 268. When the detent 257 engages the lug 261, the switch is actuated to turn on the current, and when the detent 258 engages the lug 262, the switch is actuated to break the current.

In order to secure a fine adjustment as to the timing of the current, the lug brackets 256 are adjustably mounted as before stated. To this end the brackets 256 have arcuate bases 269 provided with slots 270 to receive screws 271 threaded into holes 271' for clamping the bases in place. See Figure 1. A series of said holes 271' are provided in order that the brackets with their respective detents or lugs 261, 262 may be accurately positioned in the guideways 255 to time the device for efficiently welding seams of different lengths.

One of the primary objects of the invention is to produce uniformly perfect welds, and this can only be accomplished by maintaining a constant, uniform pressure of the wheel electrode throughout the welding period. It is to this end that the air cylinder 204 is provided. As soon as the electrode is lowered and prior to turning on the current, air under the desired pressure is admitted to the cylinder through the flexible conduit 222, and the pressure maintained constant throughout the welding period, after which the air pressure is relieved. This constant but yielding pressure not only allows the electrode to ride up onto the shorter bodied can seams, as above described, but will also accommodate the device to blank stock of different thicknesses. The admission and cutoff of the air supply is governed by an air valve controller and pressure regulator 272 having an arm or lever 273, the free end of which engages a peripheral cam 274 carried by the shaft 174. By having this cam on the shaft which carries the cam 218, the drum cam 173 and the current controlling means, the operation of the several parts of the welding machine may be nicely synchronized.

Should, for any reason, the regular sequence in feeding the blanks through the machine be broken, such as when a double blank is ejected from the machine at the rolling station, it is necessary to prevent closing the circuit to the electrodes when the blank fails to reach the welding station, in order to avoid injury to the electrodes. Accordingly, means are provided adjacent the welding station for maintaining an open circuit except when a blank is on the horn in position for welding. To this end, a spring projected lever 275 is pivotally mounted as at 276 adjacent the welding station and preferably beneath the supporting section 78 of the horn, and extends inwardly and forwardly into the path of the blanks, with its free end normally resting in a recess 277. See Figure 8. The lever 275 is connected to an arm 278 which actuates a plunger 279 of a circuit maker and breaker 280. When there is no blank positioned in the welding station the lever is raised by the spring 181 and the arm 278 is retracted to open the circuit. A blank upon entering the welding station depresses the lever 275 and actuates the circuit maker and breaker 280 to close that portion of the circuit, so that the timing mechanism hereinbefore described may function, and said lever 275 is maintained in depressed position by the blank until the blank is ejected. When the blank has been welded and ejected from the horn, the lever 275 is raised, thereby breaking the circuit until another blank is moved into the welding position.

As previously stated, at the welding station the core of the horn is an integral projection 79 from the supporting casting 78, and is provided in its upper face with a groove 160 for the fixed electrode 169, as before stated. A clamping bar 282 secured to the upper face of the core 79 holds the electrode in place. See Figure 12. Side plates 283 and 284, together with a longitudinal upper strip 285 and bottom strips 286 and 287, complete the outer portion of the horn at the welding station, said plates and strips being so shaped that their outer faces together form a complete cylindrical surface upon which the blanks are firmly wrapped for welding.

After completion of the weld, the body is ejected from the horn, but as the body blank has been tightly wrapped upon the horn it is necessary to free the same before it can be removed. To this end the side plate 284 is made collapsible or retractable, and a spring 288 is provided which normally tends to retract the plate as shown in Figures 11 and 13 of the drawings. When retracted as shown, the can body is made loose on the horn and may be readily removed therefrom in a manner hereinafter described. The plate 284 is held outwardly at all times, except when the welded body is being removed, by a reciprocatory rod 289 having cam blocks 290 secured thereto, which, when the rod is retracted into its normal position as in Figure 10, engage anti-friction rollers 291 interposed between the same and the ends of inwardly extending pins 292 fixed to the plate 284 adjacent the ends thereof. The rod 289 extends longitudinally through the horn, and is actuated by any approved means, not shown. An end member or cap 294 is secured to the outer end of the welding horn and has a bore 295 into which the end of the rod 289 projects. Bearings 296 are provided between the rod and the horn.

The ejecting means comprises a spring projected finger 297 on a finger bar 298 extending from end to end of the horn in ways 299 formed in the bottom of the horn as shown in Figures 1, 6, 12, 13, and 18. The finger bar 289 is actuated simultaneously with the finger bars 69 but has only one finger.

The cooling of the fixed electrode 159 is accomplished by the circulation of a cooling medium therethrough. Accordingly, this electrode is provided with a bore 300 extending from its forward end to near the rear end thereof. The forward end of the electrode rests in a recess 301 in the upper side of the cap 294, and said end cap, from said recess forwardly, is provided with a bore 302 in alignment with the bore 300 of the electrode and closed at the outer end by a plug 303. A perforated sleeve 304 connects the bores 300 and 302, and a gasket 305 is interposed between the end of the electrode and the adjacent portion of the cap. A sleeve 306 divides the bore 302 into two chambers, 307 and 308, and a tube 309 having one end mounted in the sleeve 306 extends axially through the sleeve 304 and the electrode to adjacent the opposite end of the bore 300. Ducts 310 and 311 are provided in the casting 78, 79 and communicate respectively with the chambers 307 and 308. Cooling fluid enters through the duct 310 and flows to the chamber 307, thence through the tube 309 to the inner end of the bore 300, then returns through the bore 300 and perforated sleeve 304 to the chamber 308 and duct 311. A spring 312 is mounted in a recess 313 in the horn and forces the electrode against the gasket 305 to maintain a fluid tight joint.

A wrench hold 314 is provided on the electrode 159, whereby the electrode may be turned from time to time to present a fresh surface along the welding line.

In Figure 33 of the drawings there is illustrated a modified form of blank edge truing means. According to this modification of the invention two cam blocks B or equivalent truing cam means may be secured to the horn in position for extending over the reduced diameter portion thereof at the welding station in the manner shown in Figure 33. This cam means presents cam surfaces C which will be engaged by the blank edges as the blank is being folded or wrapped about the horn and will function in cooperation with the members 120 to true the blank edges in the manner hereinbefore described.

It is to be understood also that although a pressure control valve and operating means therefor have been described herein for controlling introduction of air under pressure into the cylinder 204, air pressure may be constantly supplied in said cylinder during operation of the machine, if desired.

While the apparatus illustrated and described herein is particularly adapted to the manufacture of can bodies with welded side seams, it will be obvious that features of the invention claimed herein are adaptable to other uses and therefore the claims are not to be construed as limited to the specific use described except where so stated.

We claim:

1. In a can body welding machine, a welding horn, a stationary electrode arranged longitudinally in the periphery thereof, a carriage mounted for longitudinal movement relative to said horn, vertically disposed guides on said carriage, a cross-head mounted for vertical reciprocation on said guides, a movable electrode rotatably mounted on said cross-head, means for reciprocating said carriage, means for raising and lowering the movable electrode in synchronization therewith, and means mounted on said carriage for rotating said movable electrode as it is moved along over the stationary electrode in its lowered welding position.

2. In a can body welding machine, a welding horn, a stationary electrode arranged longitudinally in the periphery thereof, a carriage mounted for longitudinal movement relative to said horn, a cross-head mounted for vertical reciprocation on said carriage, a movable electrode rotatably mounted on said cross-head, means for reciprocating said carriage, means for raising and lowering the movable electrode in synchronization therewith, and means actuated by the reciprocation of the carriage for rotating the movable electrode.

3. In a can body welding machine, a welding horn, a stationary electrode arranged longitudinally thereof, a carriage mounted for longitudinal movement relative to said horn, means for reciprocating said carriage, a cross-head mounted for vertical reciprocation on said carriage, a movable electrode rotatably mounted on said cross-head, a longitudinally disposed shaft, a lever splined on said shaft and movable with said carriage, a fluid pressure cylinder carried by said cross-head, a piston in said cylinder, a link connecting the end of said lever and said piston, means for actuating said shaft and lever to raise and lower the cross-head, and means for admitting fluid under pressure below said piston when the cross-head and electrode are in lowered position.

4. In a can body welding machine, a welding horn, a carriage arranged for longitudinal reciprocation relative to said horn, means for reciprocating said carriage, a cross-head mounted for vertical reciprocation on said carriage, a movable electrode rotatably mounted on said cross-head, means for raising and lowering said cross-head, a friction wheel mounted on said carriage and engaging the periphery of said movable electrode, a fixed rack bar parallel with the path of reciprocation of said carriage, and gearing connecting said rack bar and said friction wheel for imparting rotation to the latter upon reciprocation of the carriage.

5. In a welding machine, a fixed elongated electrode in combination with a rotary electrode, means for reciprocating said rotary electrode longitudinally with relation to the fixed electrode, means for moving said rotary electrode into and out of operative relation with the fixed electrode, and means for rotating and dressing said rotary electrode, the last said means comprising a friction wheel constantly in contact with the rotary electrode and having a peripheral groove engaging the periphery of said rotary electrode, and means for driving said friction wheel for imparting rotation to the rotary electrode as it is being moved along over the fixed electrode.

6. In a welding machine, a fixed elongated electrode in combination with a rotary electrode, means for reciprocating said rotary electrode longitudinally with relation to the fixed electrode, means for moving said rotary electrode into and out of operative relation with the fixed electrode, and means for rotating said rotary electrode, the last said means comprising a friction wheel constantly in contact with the rotary electrode and having a peripheral groove engaging the periphery of said rotary electrode, and means for driving said friction wheel to impart to said electrode a peripheral speed greater than the longitudinal speed thereof.

7. In a can body welding machine, a welding horn, a stationary electrode arranged longitudinally thereof, a carriage mounted for longitudinal reciprocation relative to said horn, a cross-head mounted for vertical reciprocation in said carriage, a movable electrode rotatably mounted on said cross-head, means for wrapping a can body blank on said horn with lapped edges above said stationary electrode, a driven shaft parallel with said horn, a drum cam on said shaft for reciprocating said carriage, means for raising and lowering the cross-head, a switch for opening and closing the circuit to said electrodes, a timing device for actuating said switch comprising a trip lever mounted for pivotal movement about an axis paralleling the axis of said shaft and having two lugs thereon one at each side of the lever pivot and in longitudinally spaced planes traversing the shaft axis, and adjustable detents rotatable with said shaft and positioned to engage said lugs respectively.

8. In a can body welding machine, a horn having a portion providing a welding station at one end thereof and a portion providing a rolling station spaced longitudinally from said welding station, means at the rolling station for rolling flat blanks about the horn in generally cylindrical form, finger bars for feeding the rolled bodies from the rolling station to the welding station, wings for wrapping said blank about the horn at the welding station to place the blank edges in overlapped relation in the form of a can body side seam, stop means on the outer edges of the wings to limit the forward movement of the can blanks, a cam block on the end of each of said finger bars to true the blanks against said stops as the wings wrap the blank on the horn, and means at the welding station for weld bonding said side seam.

9. In a welding machine wherein is provided a welding station, a welding horn having a metallic core, provided with a longitudinal recess, a stationary inner electrode in said recess, a clamping strip for holding said electrode in position, outer members surrounding said core, said members and said clamping strip having their outer faces shaped to form a cylindrical surface, means for placing a blank at the welding station in shape to form a can body with blank edges overlapped in a side seam, means including an outer electrode for weld bonding the side seams at the welding station, said outer electrode being rotatable in one direction only to present fresh surface for contact with the side seams, and said inner electrode being rotatable in said recess to present a fresh welding surface when desired.

10. In a can body forming and welding machine, a horn including a portion providing a welding station, a horn support, means for feeding flat body blanks to said horn and for preshaping them about the horn with lateral edge portions spaced apart, means for feeding the preshaped blanks along the horn to the welding station with the spaced apart edge portions straddling the support in moving therepast, means for bringing said edge portions into overlapped relation at the welding station, means for truing the end edges of the preshaped blanks and means for welding the overlapped edge portions together to form a side seam.

11. In a can body forming and welding machine, a horn along which body blanks are adapted including a portion providing a welding station, a horn support closely adjacent the welding station and at the advance side thereof in the direction in which the blanks are fed, means disposed in advance of the position of the support for feeding the body blanks to said horn and for preshaping them about the horn with lateral edge portions spaced apart, means for feeding the preshaped blanks along the horn to the welding station with the spaced apart edge portions straddling the support in moving therepast, means for bringing said edge portions into overlapped relation at the welding station, end stop means and camming devices operable in combination during overlapping of the blank edge portions for truing the ends of the blank at the overlap, and means for welding the overlapped edge portions together to form a side seam.

12. In a can body welding machine, a horn, an electrode extending longitudinally at the periphery of the horn, means for placing a can body on the horn with a side seam extending along the electrode, a circular electrode, means for imparting four motion movement to the circular electrode to cause it to move toward the horn, then along the horn in rolling contact with the seam, then away from the horn and out of contact with the seam, and then back to the starting point out of contact with the seam, means for pneumatically pressing the circular electrode against the seam while it is moving therealong in rolling contact, adjustable means for controlling the pressure of the last said means while the device is in operation and means for completing a welding circuit through the electrodes while the circular electrode is moving in rolling contact with the seam.

13. In a can body welding machine, a welding horn, a stationary electrode on the horn, a rotary electrode rollable over a can body side seam on the horn, means for moving the rotary electrode longitudinally of the horn, means for moving the rotary electrode toward and from the horn to engage with or move away from a can body side seam thereon, a positively driven grooved driving and dressing roller engaged with and effective to rotate and dress the rotary electrode, and drive means for said grooved roller including an overrunning clutch effective to impart rotation to the grooved roller when the rotary electrode is being moved along the horn in one direction only.

14. In a can body welding machine, a welding horn, a stationary electrode on the horn, a rotary electrode rollable over a can body side seam on the horn, means for moving the rotary electrode longitudinally of the horn, means for moving the rotary electrode toward and from the horn to engage with or move away from a can body side seam thereon, said last named means comprising an adjustable thrust link including telescoped piston and cylinder elements, and means for directing air under pressure into said cylinder and against said piston throughout the duration of each welding operation.

15. In a can body welding machine, a welding horn, a stationary electrode arranged longitudinally thereof, trackways paralleling said horn, a carriage reciprocable along said trackways, a cross-head vertically reciprocable on the carriage and having a movable electrode rotatably mounted thereon, a driven shaft paralleling said horn, a grooved drum cam on said shaft means on said carriage engaging in said grooved drum for reciprocating the same, means for lifting and lowering the cross-head and comprising a shaft parallel to the axis of said drum, a lever splined thereon, a thrust link connecting said lever and said cross-head and including telescoped piston and cylinder elements, a cam on said driven shaft for oscillating the second said shaft and means controlled by a cam on said driven shaft for directing air under pressure into said cylinder and against said piston throughout the duration of each welding operation.

16. In a can body welding machine, a welding horn, a stationary electrode arranged longitudinally thereof, trackways paralleling said horn, a carriage reciprocable along said trackways, a cross-head vertically reciprocable on the carriage and having a movable electrode rotatably mounted thereon, a driven shaft paralleling said horn, a grooved drum cam on said shaft and being connected with the carriage for reciprocating the same, means for lifting and lowering the cross-head and comprising a thrust link including telescoped piston and cylinder elements, means controlled by a cam on said shaft for directing air under pressure into said cylinder and against said piston throughout the duration of each welding operation, a switch for opening and closing the circuit to said electrodes, a timing device for actuating said switch comprising a pivotally mounted trip lever having lugs thereon on opposite sides of the pivot and in different planes transversely of the shaft, and adjustable detents rotatable with said shaft and positioned to engage said lugs respectively.

17. In a can body welding machine, a welding horn, a stationary electrode arranged longitudinally thereof, trackways paralleling said horn, a carriage reciprocable along said trackways, a cross-head vertically reciprocable on the carriage and having a movable electrode rotatably mounted thereon, a driven shaft paralleing said horn, a grooved drum cam on said shaft and being connected with the carriage for reciprocating the same, means for lifting and lowering the cross-head, a rack paralleling the horn, a shaft rotatably supported on the carriage and disposed transversely with respect to the horn and having a pinion thereon meshing with the rack so as to be driven as the carriage reciprocates, and a grooved driving and dressing roll engaged with the rotatable electrode and driven by said transverse shaft.

18. In a can body welding machine, a welding horn, a stationary electrode arranged longitudinally thereof, trackways paralleling said horn, a carriage reciprocable along said trackways, a cross-head vertically reciprocable on the carriage and having a movable electrode rotatably mounted thereon, a driven shaft paralleling said horn, a grooved drum cam on said shaft and being connected with the carriage for reciprocating the same, means for lifting and lowering the cross-head, a rack paralleling the horn, a shaft rotatably supported on the carriage and disposed transversely with respect to the horn and having a pinion thereon meshing with the rack so as to be driven as the carriage reciprocates, an upright hanger arm swingable about said transverse shaft, a grooved driving and dressing roll carried by the arm and engaged with the rotatable electrode, a gear couple between said roll and transverse shaft including an overrunning clutch effective to drive the roll in one direction only, and means for holding said roll against the rotatable electrode.

PAUL E. PEARSON.
ALFRED TREFF.

REFERENCES CITED

The following references are of record in the file of this patent:

UNITED STATES PATENTS

| Number | Name | Date |
| --- | --- | --- |
| 785,584 | Wheaton | Mar. 21, 1905 |
| 858,507 | Fulton et al. | July 2, 1907 |
| 904,771 | Fulton | Nov. 24, 1908 |
| 949,722 | Abrams | Feb. 15, 1910 |
| 1,094,179 | Warme | Apr. 21, 1914 |
| 1,475,399 | Kronquest | Nov. 27, 1923 |
| 1,569,127 | Holt | Jan. 12, 1926 |
| 1,574,848 | Peck | Mar. 2, 1926 |
| 1,628,928 | Taylor | May 17, 1927 |
| 1,854,957 | Richard | Apr. 19, 1932 |
| 2,047,964 | Hothersall | July 21, 1936 |
| 2,071,418 | McBerty | Feb. 23, 1937 |
| 2,167,766 | Mirfield | Aug. 1, 1939 |
| 2,179,802 | Sykes | Nov. 14, 1939 |
| 2,187,740 | Hothersall | Jan. 23, 1940 |
| 2,200,887 | Lockwood | May 14, 1940 |
| 2,204,549 | Murch | June 18, 1940 |
| 2,236,848 | Graham et al. | Apr. 1, 1941 |
| 2,307,089 | Winters | Jan. 5, 1943 |
| 2,323,349 | Odquist | July 6, 1943 |
| 2,412,166 | Mero et al. | Dec. 3, 1946 |
| 2,458,008 | Kruse | Jan. 4, 1947 |